(12) United States Patent
Park et al.

(10) Patent No.: US 8,844,317 B2
(45) Date of Patent: Sep. 30, 2014

(54) COMPRESSOR AND REFRIGERATING MACHINE HAVING THE SAME

(75) Inventors: Bokann Park, Gyeongsangnam-Do (KR); Philho Cho, Gyeongsangnam-Do (KR)

(73) Assignee: LG Electronics Inc., Seoul (KR)

(*) Notice: Subject to any disclaimer, the term of this patent is extended or adjusted under 35 U.S.C. 154(b) by 717 days.

(21) Appl. No.: 13/032,180

(22) Filed: Feb. 22, 2011

(65) Prior Publication Data

US 2011/0214451 A1 Sep. 8, 2011

(30) Foreign Application Priority Data

Mar. 8, 2010 (KR) .................. 10-2010-0020519

(51) Int. Cl.

| F25B 1/00 | (2006.01) |
| F01C 21/02 | (2006.01) |
| F04B 39/00 | (2006.01) |
| F04B 27/04 | (2006.01) |
| F04C 18/356 | (2006.01) |
| F04C 18/02 | (2006.01) |
| F25B 31/02 | (2006.01) |
| F04C 29/06 | (2006.01) |

(52) U.S. Cl.
CPC .............. F04B 39/00 (2013.01); F04C 18/356 (2013.01); F04C 18/0215 (2013.01); F01C 21/02 (2013.01); F04B 27/04 (2013.01); F25B 31/02 (2013.01); F04C 2240/56 (2013.01); F04C 29/06 (2013.01)
USPC .......................................................... 62/498

(58) Field of Classification Search
CPC ...... F04B 27/04; F04B 39/0246; F01C 21/02; F04C 2240/56

USPC .......... 62/89, 498, 508; 417/365, 410.1, 415, 417/423.12, 902; 384/46–54, 188, 190.3
See application file for complete search history.

(56) References Cited

U.S. PATENT DOCUMENTS

| 4,883,413 | A | 11/1989 | Perevuznik et al. |
| 5,687,582 | A * | 11/1997 | Mangyo et al. ............... 62/298 |
| 6,948,418 | B2 * | 9/2005 | Kim ............................. 92/140 |
| 7,137,791 | B2 * | 11/2006 | Manke et al. ................ 417/415 |
| 2003/0096668 | A1 * | 5/2003 | Yoshida et al. ............... 474/39 |
| 2004/0221716 | A1 * | 11/2004 | Kim ............................ 92/140 |
| 2007/0058895 | A1 * | 3/2007 | Paschoalino ............... 384/617 |
| 2009/0116982 | A1 * | 5/2009 | Tsuboi ...................... 417/410.1 |
| 2009/0136369 | A1 * | 5/2009 | Kakiuchi et al. ........... 417/410.1 |
| 2010/0047093 | A1 * | 2/2010 | Watanabe ................... 417/415 |

FOREIGN PATENT DOCUMENTS

| CN | 1548733 | A | | 11/2004 | |
| CN | 101111676 | A | | 1/2008 | |
| JP | 2000228842 | | * | 8/2000 | .......... F16C 25/06 |
| JP | 2002-195274 | A | | 7/2002 | |
| JP | 2008-002371 | A | | 1/2008 | |
| JP | 2008002371 | | * | 1/2008 | .......... F04B 39/00 |
| WO | 2007/061103 | A1 | | 5/2007 | |

* cited by examiner

*Primary Examiner* — Frantz Jules
*Assistant Examiner* — Emmanuel Duke
(74) *Attorney, Agent, or Firm* — McKenna Long & Aldridge, LLP (57) ABSTRACT

Disclosed are a compressor and a refrigerating machine having the same, wherein a bearing member (ball bearing) is installed between both thrust bearing surfaces and an elastic member is disposed between the bearing member and at least one of the thrust bearing surfaces so as to allow a rolling contact between the ball bearing and the thrust bearing surface or a washer, thereby reducing a frictional loss at the thrust bearing surface and enhancing the performance of the compressor.

9 Claims, 6 Drawing Sheets

COMPRESSOR AND REFRIGERATING MACHINE HAVING THE SAME

CROSS-REFERENCE TO RELATED APPLICATION

Pursuant to 35 U.S.C. §119(a), this application claims the benefit of earlier filing date and right of priority to Korean Application No. 10-2010-0020519, filed on Mar. 8, 2010, the contents of which is incorporated by reference herein in its entirety.

BACKGROUND OF THE INVENTION

1. Field of the Invention

This specification relates a compressor, and particularly, to a compressor having a ball bearing installed at a thrust bearing surface between a cylinder block and a crank shaft, and a refrigerating machine having the same.

2. Background of the Invention

In general, a hermetic compressor is a compressor provided with a motor unit disposed in a hermetic container for generating a driving force, and a compression unit operated by receiving the driving force from the motor unit. The hermetic compressors may be categorized into a reciprocating type, a rotary type, a vane type and a scroll type according to the compression mechanism with respect to a refrigerant as a compressible fluid.

The reciprocating compressor is configured such that a crank shaft is coupled to a rotor of a motor unit, a connecting rod is coupled to the crankshaft of the motor unit and a piston is coupled to the connecting rod, so that the piston linearly reciprocates within a cylinder to thereby compress a refrigerant.

The reciprocating compressor is configured such that a shaft portion of a crank shaft is inserted into a cylinder block to be supported in a journal direction and simultaneously an eccentric mass portion is laid on the cylinder block to be supported in a thrust direction as well, thereby forming a journal bearing surface and a thrust bearing surface between the crank shaft and the cylinder block. Hence, how to reduce the frictional loss between the journal bearing surface and the thrust bearing surface as much as possible acts as an important factor on enhancing energy efficiency of the compressor.

To this end, an oil passage is formed at the crank shaft so that oil pumped from an oil feeder can evenly be supplied to each bearing surface via the oil passage.

However, the related art reciprocating compressor has a limitation on reducing a frictional loss because the cylinder block and the eccentric mass portion of the crank shaft, which define the thrust bearing surface, generate a surface-contact therebetween. Considering such limitation, an approach of installing a bearing, such as a ball bearing, which may generate a point-contact with the thrust bearing surface, has been introduced.

However, when the ball bearing is installed at the thrust bearing surface between the cylinder block and the crank shaft, a sliding contact may occur between the ball bearing and the cylinder block or crank shaft, which may cause more increase in the frictional loss.

SUMMARY OF THE INVENTION

Therefore, to address such problems, an aspect of the detailed description is to provide a compressor capable of reducing a frictional loss by allowing a rolling contact between a ball bearing and a thrust bearing surface, and a refrigerating machine having the same.

To achieve these and other advantages and in accordance with the purpose of this specification, as embodied and broadly described herein, there is provided a compressor including a cylinder block having a cylinder defining a compression space, and having a first thrust bearing surface at one side of the cylinder, a crank shaft having a second thrust bearing surface supported at the first thrust bearing surface, and performing a rotating motion with respect to the cylinder block, the crank shaft being coupled to a piston inserted into the cylinder to transfer a driving force for a reciprocating motion of the piston, a bearing member disposed between the first thrust bearing surface and the second thrust bearing surface, and an elastic member disposed between the bearing member and the first thrust bearing surface or between the bearing member and the second thrust bearing surface to support the bearing member in a thrust direction.

To achieve these and other advantages and in accordance with the purpose of this specification, as embodied and broadly described herein, there is provided a compressor including a ball bearing disposed between both thrust bearing surfaces for supporting a crank shaft in a thrust direction, the ball bearing functioning as a bearing, and an elastic member provided to have elasticity with respect to the ball bearing in the thrust direction to support the ball bearing.

To achieve these and other advantages and in accordance with the purpose of this specification, as embodied and broadly described herein, there is provided a refrigerating machine including a compressor, a condenser connected to a discharge side of the compressor, an expansion apparatus connected to the condenser, and an evaporator connected to the expansion apparatus and connected to a suction side of the compressor, wherein the compressor is configured such that an elastic member supports a ball bearing disposed between both thrust bearing surfaces.

The foregoing and other objects, features, aspects and advantages of the present disclosure will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of a compressor and a refrigerating machine having the same according to the exemplary embodiments, with reference to the accompanying drawings. For the sake of brief description with reference to the drawings, the same or equivalent components will be provided with the same reference numbers, and description thereof will not be repeated.

Figure 1:
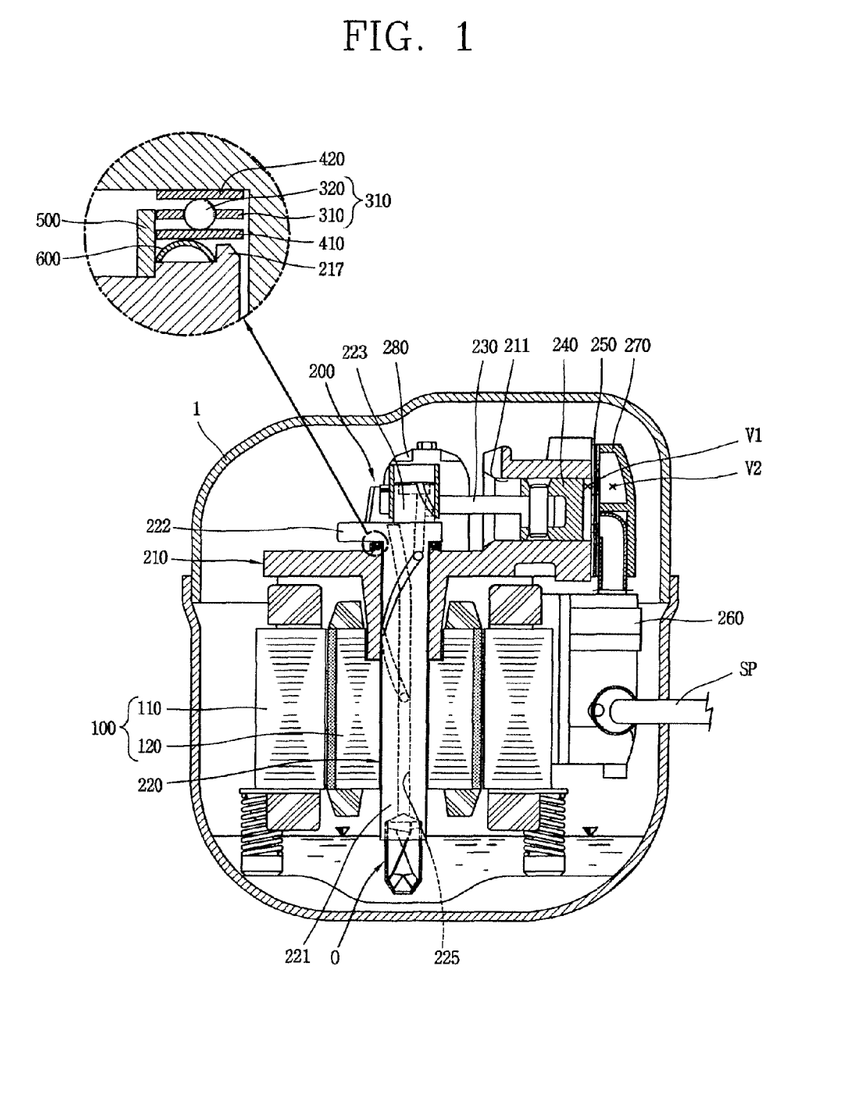
FIG. 1 is a longitudinal sectional view showing an exemplary reciprocating compressor.

FIG. 1 is a longitudinal sectional view showing an exemplary reciprocating compressor.

As shown in FIG. 1, a reciprocating compressor may include a motor unit 100 installed within a hermetic container 1 to perform forward and reverse rotations, and a compression unit 200 installed above the motor unit 100 to compress a refrigerant by receiving a rotational force from the motor unit 100.

The motor unit 100 may be implemented as a constant-speed motor or an inverter motor, which can perform the forward rotation or the reverse rotation. The motor unit 100 may include a stator 110 elastically installed within the hermetic container 1 by being supported by a cylinder block 210, and a rotor 120 rotatably installed within the stator 110.

The compression unit 200 may include a cylinder block 210 having a cylinder 211 to form a compression space and elastically supported by the hermetic container 1, a crank shaft 220 inserted in the cylinder block 210 to be supported in a journal direction and in a thrust direction, and coupled to the rotor 120 of the motor unit 100 to transfer the rotational force, a connecting rod 230 rotatably coupled to the crank shaft 220 to convert a rotating motion into a linear motion, a piston 240 rotatably coupled to the connecting rod 230 to compress a refrigerant with linearly reciprocating within the cylinder 211, a valve assembly 250 coupled to a front end of the cylinder block 210 and having a suction valve and a discharge valve, a suction muffler 260 coupled to a suction side of the valve assembly 250, a discharge cover 270 coupled to house a discharge side of the valve assembly 250, and a discharge muffler 280 communicating with the discharge cover 270 to reduce discharge noise of a discharged refrigerant.

An unexplained reference numeral O denotes an oil feeder.

With the configuration of the reciprocating compressor, when power is applied to the stator 110 of the motor unit 100, the rotor 120 is rotated together with the crank shaft 220 by virtue of an interaction between the stator 110 and the rotor 120. Accordingly, the connecting rod 230 coupled to a cam portion 223 of the crank shaft 220 orbits. The piston 240 coupled to the connecting rod 230 then linearly reciprocates within the cylinder 211 so as to compress a refrigerant. The compressed refrigerant is discharged into the discharge cover 270. The refrigerant discharged into the discharge cover 270 is introduced into a refrigeration cycle via the discharge muffler 280. The series of operations are repeated.

Simultaneously, in response to the rotation of the crank shaft 220, an oil feeder O installed at a lower end of the crank shaft 220 pumps up oil, which is stored in an oil storage of the hermetic container 1. The pumped-up oil is sucked up via an oil passage so as to be partially supplied to each bearing surface and partially scattered at an upper end of the crank shaft 220 to cool the motor unit 100.

Here, the crank shaft may be supported by a journal bearing disposed in the cylinder block 210 in a journal direction and supported by a bearing member disposed at a thrust bearing surface of the cylinder block in a thrust direction. Accordingly, the crank shaft can be rotated in a stable state.

Figure 2:
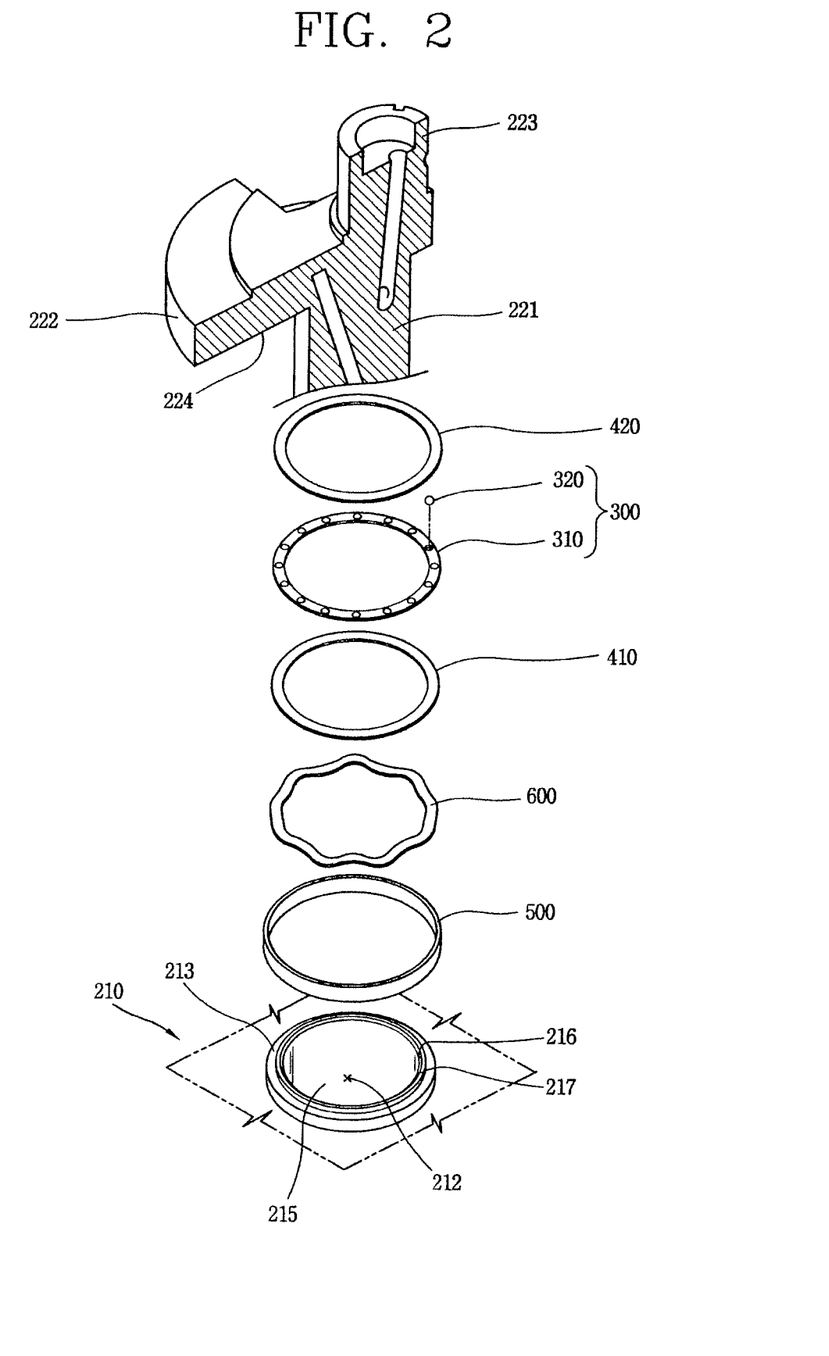
FIG. 2 is a perspective view showing a disassembled state of a ball bearing and an elastic member of the reciprocating compressor shown in FIG. 1.
Figure 3:
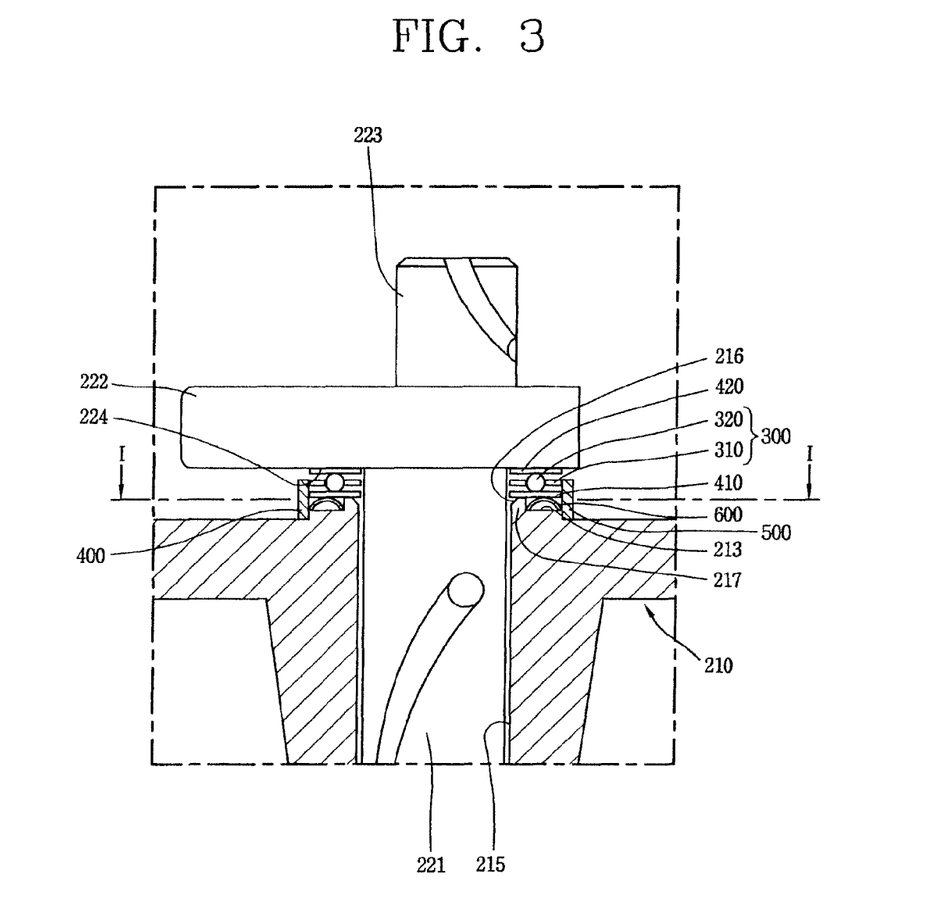
FIG. 3 is a sectional view showing a periphery of a thrust bearing surface of the reciprocating compressor shown in FIG. 1.
Figure 4:
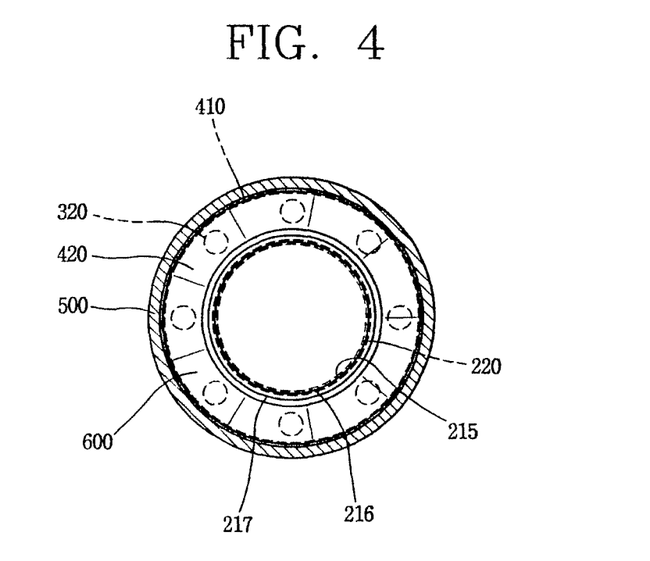
FIG. 4 is a sectional view taken along the line "I-I" of FIG. 3.
Figure 5:
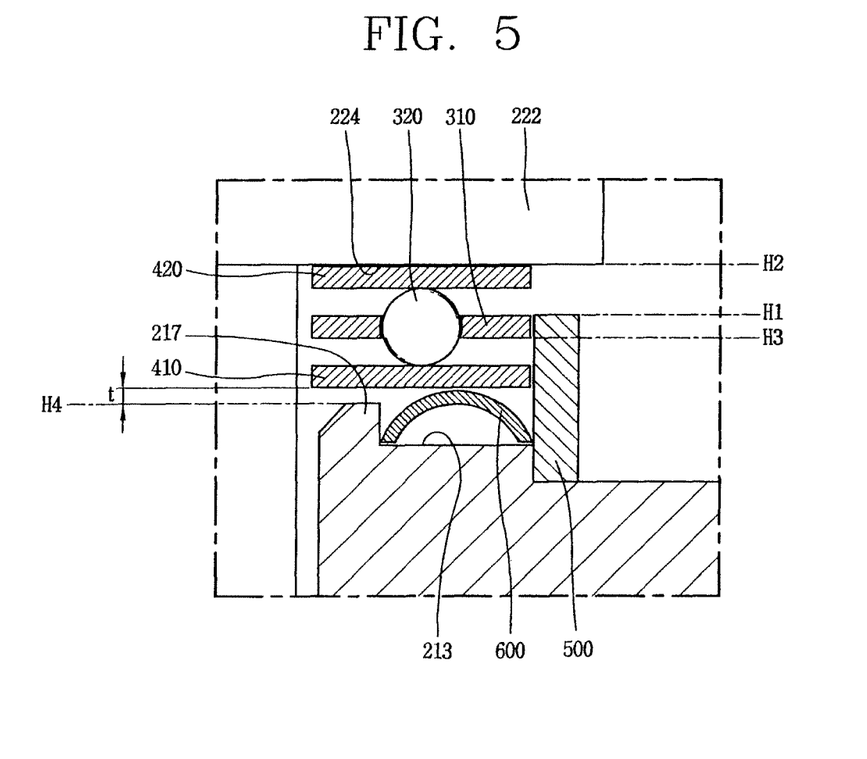
FIG. 5 is a schematic view showing heights of an extending portion and a block guide defining the thrust bearing surface of FIG. 3.

FIG. 2 is a perspective view showing a disassembled state of a ball bearing and an elastic member of the reciprocating compressor shown in FIG. 1, FIG. 3 is a sectional view showing a periphery of a thrust bearing surface of the reciprocating compressor shown in FIG. 1, FIG. 4 is a sectional view taken along the line "I-I" of FIG. 3, and FIG. 5 is a schematic view showing heights of an extending portion and a block guide defining the thrust bearing surface of FIG. 3.

As shown in FIG. 2, the cylinder block 210 may include a bearing hole 212 defining a journal bearing surface 215 such that the crank shaft 220 is inserted thereinto to be supported in the journal direction, and a cylinder block side thrust bearing surface (hereinafter, referred to as 'first thrust bearing surface') 213 formed at an upper periphery of the bearing hole 212 to support a bearing member 300 and an elastic member 600, which will be explained later, in the thrust direction such that the bearing member 300 can support a lower surface of an eccentric mass portion 222 of the crank shaft 220 in the thrust direction. An oil pocket 216, in which a particular amount of oil is collected, may be chamfered or rounded in an inner edge of the first thrust bearing surface 213, namely, an edge where the journal bearing surface 215 comes in contact with the first thrust bearing surface 213.

The crank shaft 220, as shown in FIGS. 3 and 4, may include a shaft portion 221 coupled to the rotor 120 and inserted into the bearing hole 212 of the cylinder block 210 to be supported at the cylinder block 210 in the journal direction, an eccentric mass portion 222 eccentrically formed at an upper end of the shaft portion 221 in a shape of a fan or an eccentric circular flange to be supported by a bearing member 300, which is to be laid on the first thrust bearing surface 213 of the cylinder block 210, and a cam portion 223 formed at an upper surface of the eccentric mass portion 222 to be eccentric with respect to the shaft portion 221 and having the connecting rod 230 rotatably inserted thereinto.

Referring to FIG. 3, the bearing member 300 may be implemented as a ball bearing (hereinafter, mixed with a bearing member), which is disposed between the first thrust bearing surface 213 formed at the upper surface of the cylinder block 210 and a crank shaft side thrust bearing surface (hereinafter, referred to as 'second thrust bearing surface') 224 formed at a lower surface of the eccentric mass portion 222 of the crank shaft 220. Both thrust bearing surfaces of the ball bearing 300 in the thrust direction may be shown having a lower washer 410 (hereinafter, referred to as a first washer) and an upper washer 420 (hereinafter, referred to as a second washer), which enhance a bearing effect (function) of the ball bearing 300.

The ball bearing 300 may include a ball cage 310 formed in an annular shape and having an outer diameter, which is not greater than an inner diameter of a block guide 500 to be explained later, and a plurality of balls 320 rotatably coupled to the ball cage 310 and having a predetermined diameter so as to act as a bearing between the cylinder block 210 and the crank shaft 220.

The first wash 410 and the second washer 420 may be made of a lubricative material, namely, plastic or metal, and have an outer diameter, which is almost the same as the outer diameter of the ball cage 310. Also, the first and second washers 410 and 420 each may have a thickness, which is not greater than the diameter of the ball 320. That is, the diameter of the ball 320 may be formed within the range of 1.5~10 times of the thicknesses of the first and second washers 410 and 420, so as to maintain rigidity of the ball 320 in the thrust direction.

In the reciprocating compressor, the eccentric mass portion 222 of the crank shaft 220 may extend in the journal direction to define a thrust bearing surface with the cylinder block 210, and the ball bearing 300 may be disposed between the eccentric mass portion 222 of the crank shaft 220 and the cylinder block 210 so as to reduce a frictional loss, which may occur at the thrust bearing surfaces 213 and 224 between the eccentric mass portion 222 and the cylinder block 210 upon rotation of the crank shaft 220.

However, if a too wide interval is present between the first thrust bearing surface 213 and the second thrust bearing surface 224, the oil pumped up via the oil passage 225 of the crank shaft 220 may partially flow toward the thrust bearing surface 212 and 224. Especially, if a bearing, such as the ball bearing 300, having a predetermined height and a gap in a circumferential direction, is installed between the thrust bearing surfaces 213 and 224, an interval between the thrust bearing surfaces 213 and 224, namely, an interval between the first thrust bearing surface 213 and the second thrust bearing surface 224 is increased as much as the height of the ball bearing 300, which may cause an increase in an amount of leaked oil (oil leakage).

Considering this problem, if the height of the ball bearing 300 installed between the cylinder block 210 and the crank shaft 220, namely, the diameter of the ball 320 is formed as small as possible, the ball 320 of the ball bearing 300 may be fallen into the oil pocket 216, which is present between the first thrust bearing surface 213 and the journal bearing surface 215 of the cylinder block 210, thereby causing the ball bearing 300 to be unable to act as a bearing. Therefore, in order to use a ball with a small diameter and maintain reliability of the compressor, it may need to form a block guide 500 having a predetermined height at an outer circumferential surface of a ball bearing 300 such that a displacement of the ball bearing 300 in the journal direction can be maintained within a certain range.

The block guide 500 may be configured to have a predetermined height at an edge of the first thrust bearing surface 213, namely, configured such that a height H1 of an upper surface (end) of the block guide 500 can be lower than a height H2 of an upper surface (end) of the second washer 420 so as not to be contacted by the second thrust bearing surface 224 of the crank shaft 220.

The block guide 500 may be formed in an annular shape to be inserted into the first thrust bearing surface 213. Alternatively, the block guide 500 may integrally extend from the first thrust bearing surface 213 in the thrust direction to be stepped. Also, although not shown, if the first thrust bearing surface 213 is formed wide, the block guide 500 may be laid on the thrust bearing surface and fixed thereto by a fixing member.

Here, the height H1 of the block guide 500 may preferably be formed to be higher than at least a height H3 up to the lower surface of the ball cage 310, namely, the height H3 from the first thrust bearing surface 213 up to the lower surface of the ball cage 310. More particularly, the height H1 of the block guide 500 may be formed as high as a height approximately from the first thrust bearing surface 213 to the middle of the second washer 420, thereby avoiding a horizontal fluctuation (shaking) of the ball cage 310 and the second washer 420.

Therefore, in the reciprocating compressor with the configuration, the ball bearing may be installed between the first and second thrust bearing surfaces, accordingly, the frictional loss at the thrust bearing surfaces can be remarkably reduced, resulting in improving energy efficiency of the compressor.

As the ball bearing can be formed to have a lower height, an oil leakage, which may be caused due to an excessive interval between the cylinder block and the crank shaft, can be reduced. In addition, a moment arm of the crank shaft can be reduced in length to minimize (prevent) an increase in the force applied to the journal bearing surface of the crank shaft, and accordingly a motor input can be lowered, thereby further improving the compressor efficiency.

Also, the ball can be formed with a smaller diameter and the block guide can be formed at the cylinder block to support the ball cage in the journal direction so as to make the ball bearing stay in place, thereby obviating function degradation of the ball bearing.

In the meantime, an elastic member for elastically supporting the bearing member in the thrust direction may further be disposed at the lower surface of the bearing member so as to allow a rolling contact between the bearing member and the first or second washer, thereby reducing the frictional loss at the thrust bearing surfaces.

Referring to FIGS. 2 and 3, the elastic member 600 may be a leaf spring having a sinuous cross-section. Here, any member, which can be elastically transformed in the thrust direction, may be employed as the elastic member 600. Although not shown, the elastic member 600 may be configured, for example, by a plurality of coil springs and a spring sheet laid on upper surfaces of the coil springs.

The elastic member 600 may have an outer circumferential surface, which is supported in the journal direction in a contact state with an inner circumferential surface of the block guide 500. Alternatively, as shown in FIGS. 4 and 5, a thrustwise extending portion 217 having a predetermined height H4 may be formed inside the first thrust bearing surface 213, namely, at the periphery of the bearing hole 212, and the inner circumferential surface of the elastic member 600 may be supported at the outer circumferential surface of the thrustwise extending portion 217 in the journal direction.

The thrustwise extending portion 217 may have an upper surface, which maintains a constant interval t from a lower surface of the ball bearing 300, namely, the lower surface of the first washer 410, accordingly, the frictional loss with the lower surface of the first washer 410 of the ball bearing 300 can be reduced and also a rolling contact can be induced between the ball 320 and the first and second washers 410 and 420 of the ball bearing 300, thereby reducing the frictional loss. That is, if the upper surface of the thrustwise extending portion 217 is formed the same as or higher than the height prior to transformation of the elastic member 600, the upper surface of the thrustwise extending portion 217 may continuously contact the lower surface of the first washer 410 of the ball bearing 300, thereby increasing the frictional loss. Furthermore, in that structure, the first washer 410 has a uniform height surface due to the thrustwise extending portion 217 and consequently a sliding contact may be generated between the first washer 410 and the ball 320 of the ball bearing 300, thereby increasing the frictional loss. Hence, the upper surface of the thrustwise extending portion 217 may be formed lower than the height prior to the transformation of the elastic member 600, namely, higher than a minimum displacement of the elastic member 600 and lower than a maximum displacement of the elastic member 600. Consequently, the first washer 410 may not, if possible, contact the thrustwise extending portion 217 and also the first washer 410 and the ball 320 of the ball bearing 300 can make a rolling contact therebetween, thereby reducing the frictional loss.

Meanwhile, the thrustwise extending portion may be formed in an annular shape as shown in FIG. 4. However, in some cases, it may be created in the form of protrusions, which protrude with preset intervals in a circumferential direction. Also, the positions where the thrustwise extending portion and the block guide are located can be changed.

If the reciprocating compressor is applied to a refrigerating machine, the performance of the refrigerating machine can be improved.

Figure 6:
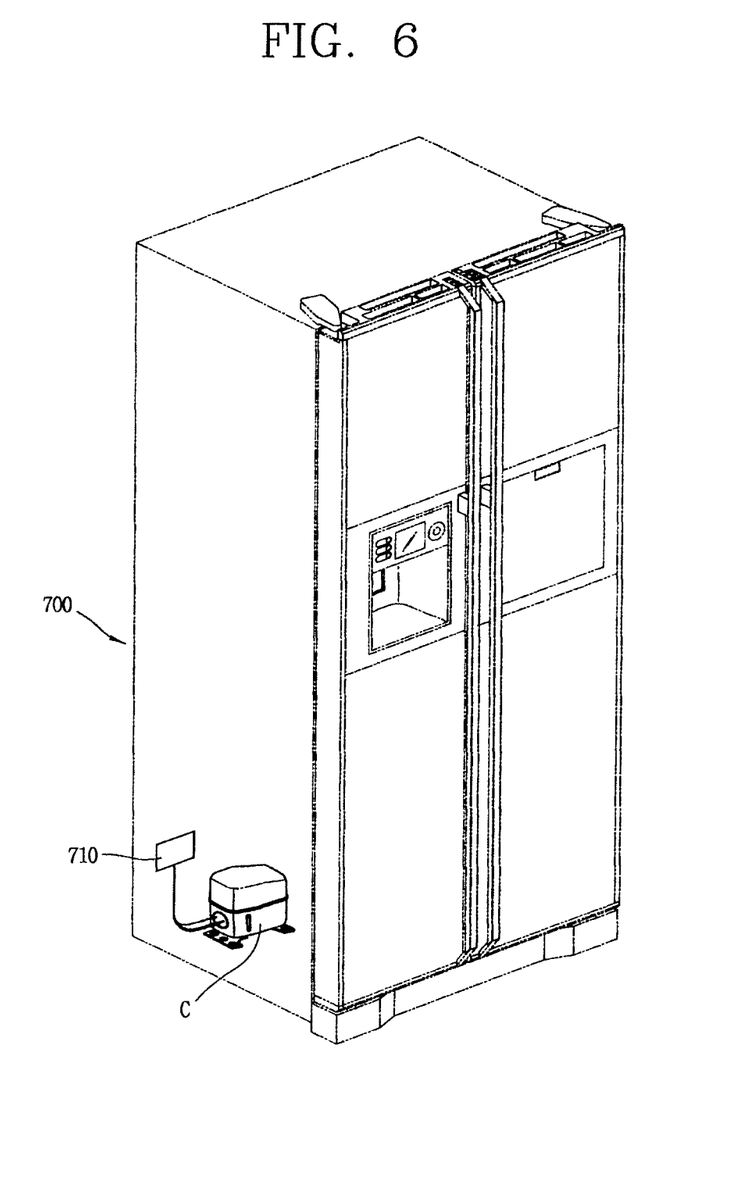
FIG. 6 is a schematic view showing an exemplary refrigerator having the reciprocating compressor.

For example, referring to FIG. 6, regarding a refrigerating machine 700 having a refrigerant compression type refrigeration cycle, which includes a compressor, a condenser, an expansion apparatus and an evaporator, the ball bearing 300 whose ball diameter is small is installed at the thrust bearing surface in a main board 710, which controls overall operations of the refrigerating machine 700. Also, the cylinder block 210 may be shown having the block guide 500 for supporting the second washer 420 as well as the ball bearing 300 and the first washer 410 in the journal direction so as to minimize (prevent) the movement of the ball bearing 300 and the second and first washers 410 and 420 in the journal direction, thereby decreasing the size of the ball bearing 300. Hence, the oil leakage via the ball bearing 300 can be obviated and also the degradation of the bearing function due to the out-of-place ball bearing 300 can be obviated. The elastic member 600 for elastically supporting the ball bearing 300 in the thrust direction may be installed at the lower surface of the ball bearing 300 so as to allow the rolling contact between the ball bearing 300 and the first and second washers 410 and 420, thereby enhancing the bearing function of the ball bearing 300. The thrustwise extending portion 217 for restricting the transformed level of the elastic member 600 may be formed in the cylinder block 210 so as to minimize an excessive inclination of the crank shaft 220 due to the use of the elastic member 600, thereby reducing vibration of the compressor. Accordingly, the refrigerating machine can acquire the effect, which has been mentioned in the description of the reciprocating compressor, and also the performance of the refrigerating machine having the reciprocating compressor can be improved.

Figure 7:
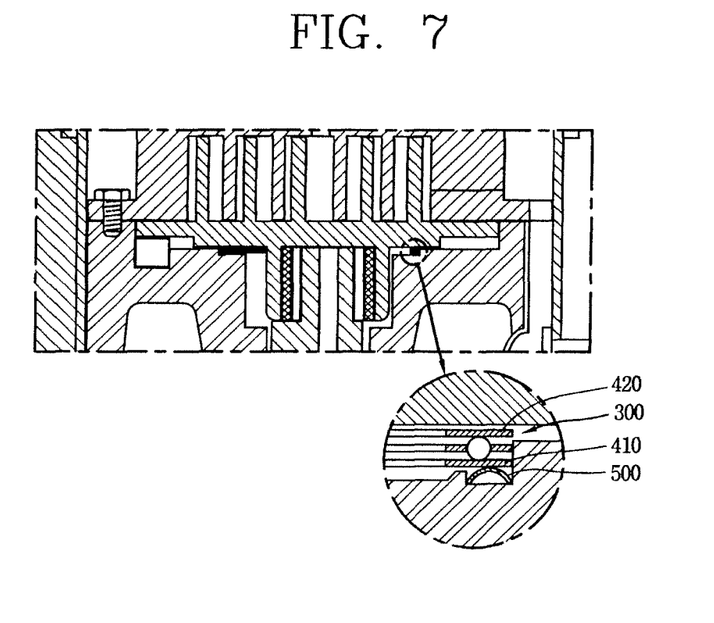
FIGS. 7 and 8 are schematic views showing a scroll compressor and a rotary compressor having the ball bearing and the elastic member.
Figure 8:
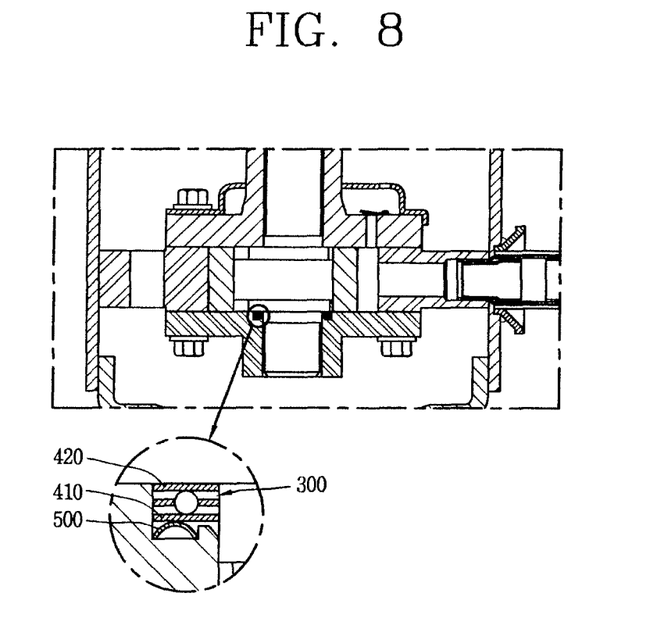

In the meantime, when the ball bearing is applied to a thrust bearing surface between a frame and an orbiting scroll of a scroll compressor as shown in FIG. 7, or to a thrust bearing surface between a bearing member and a crank shaft of a rotary compressor as shown in FIG. 8, the washers and the elastic member may equally be applied to the lower surface of the ball bearing, which will not be described in detail.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A compressor comprising: a cylinder block having a cylinder defining a compression space, and having a first thrust bearing surface at one side of the cylinder; a crank shaft having a second thrust bearing surface supported at the first thrust bearing surface, and performing a rotating motion with respect to the cylinder block, the crank shaft being coupled to a piston inserted into the cylinder to transfer a driving force for a reciprocating motion of the piston; a bearing member disposed between the first thrust bearing surface and the second thrust bearing surface; an elastic member disposed between the bearing member and the first thrust bearing surface or between the bearing member and the second thrust bearing surface to support the bearing member in a thrust direction; an extending portion protruded from the first thrust bearing surface in the thrust direction; and a block guide formed at the first thrust bearing surface to support the bearing member in a journal direction; wherein the bearing member comprises: an annular ball cage; a plurality of balls rotatably coupled to the ball cage with predetermined intervals in a circumferential direction; a first washer presented between the ball of the bearing member and the elastic member; and a second washer is present between the bearing member and the second thrust bearing surface; and wherein the elastic member is a leaf spring having a sinuous cross-sectional shape and an annular shape, wherein the extending portion is formed such that an upper surface of the extending portion is higher than a topmost curvature of the leaf spring when compressed and lower than the topmost curvature of the leaf spring when uncompressed, the extending portion and the block guide both are protruded from the first thrust bearing surface in the thrust direction with interposing the leaf spring therebetween; wherein the extending portion and the block guide have different heights; and wherein the extending portion is located below a lower surface of a first washer and has a height such that an upper surface thereof maintains a predetermined interval from a lower surface of the first washer.

2. The compressor of claim 1, wherein an inner circumferential surface of the elastic member is supported at an outer circumferential surface of the extending portion in the journal direction.

3. The compressor of claim 1, wherein the block guide is lower than an upper surface of the upper washer.

4. The compressor of claim 3, wherein the block guide is formed at a position corresponding to an outer circumferential surface of the bearing member.

5. The compressor of claim 1, wherein the extending portion is integrally formed with the cylinder block, and the block guide is assembled with the cylinder block.

6. The compressor of claim 1, wherein the first washer and the second washer are provided at both sides of the bearing member, respectively, wherein the block guide is formed at an outer circumferential surface of the second washer to be higher than a height of a lower surface of the second washer and lower than a height of an upper surface thereof.

7. A refrigerating machine comprising:
a compressor;
a condenser connected to a discharge side of the compressor;
an expansion apparatus connected to the condenser; and
an evaporator connected to the expansion apparatus and connected to a suction side of the compressor,
wherein the compressor is a compressor according to claim 1.

8. A compressor comprising: a ball bearing disposed between both thrust bearing surfaces for supporting a crank shaft in a thrust direction, the ball bearing functioning as a bearing; an elastic member provided to have elasticity with respect to the ball bearing in the thrust direction to support the ball bearing; and an extending portion protruded in the thrust direction from a thrust bearing surface, having the elastic member laid thereon, wherein the extending portion is located below a lower surface of the ball bearing; wherein a block guide is protruded, by a predetermined height, from the thrust bearing surface where the elastic member is laid, the block guide supporting the ball bearing in a journal direction, wherein the block guide is lower than an upper surface of the second washer; and wherein the extending portion and the block guide are formed with interposing the elastic member therebetween, the extending portion and the block guide having different heights.

9. The compressor of claim 8, wherein a first washer and a second washer are disposed on both sides of the ball bearing in a contact state.

* * * * *